Dec. 18, 1923.
R. C. STEWART
LUGGAGE CARRIER
Filed Feb. 25, 1922
1,478,304
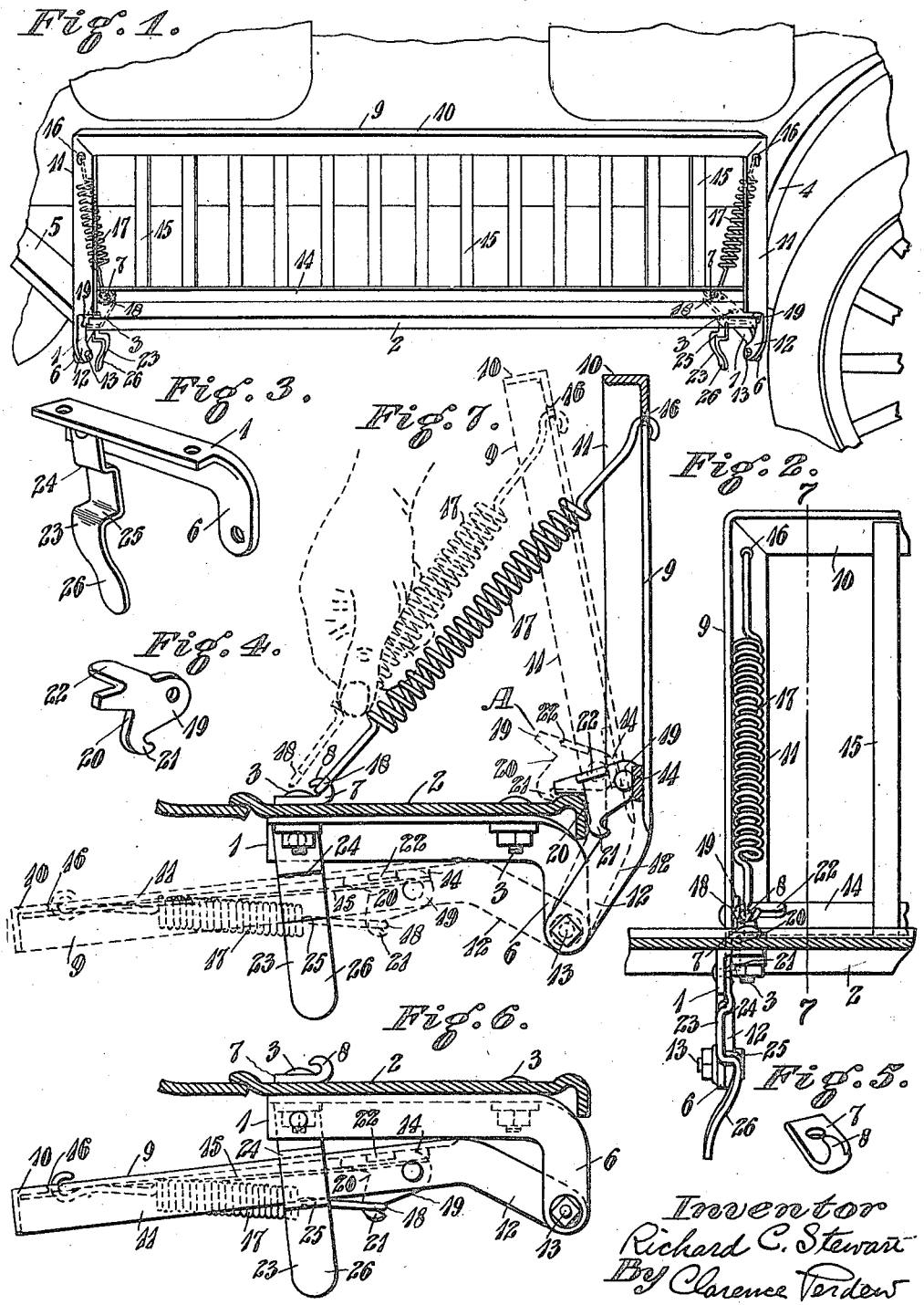
Inventor
Richard C. Stewart
By Clarence Verdew
Attorney.

Patented Dec. 18, 1923.

1,478,304

UNITED STATES PATENT OFFICE.

RICHARD C. STEWART, OF COVINGTON, KENTUCKY.

LUGGAGE CARRIER.

Application filed February 25, 1922. Serial No. 539,106.

*To all whom it may concern:*

Be it known that I, RICHARD C. STEWART, a citizen of the United States, residing at Covington, in the county of Kenton and State of Kentucky, have invented certain new and useful Improvements in Luggage Carriers, of which the following is a specification.

My invention relates to package and article carriers on vehicles. Its object is to provide for carrying luggage on a motor vehicle, preferably on one of the running boards thereof, with a minimum of labor and attention required for placing the device in condition for use or out of the way when not to be used. A further object is to provide for this in such a way that the device will not rattle under the vibration of the vehicle. Another object is to permit of easy mounting of the device on the vehicle without making any extra openings in or otherwise marring the structure of the vehicle. Other objects will appear in the course of the ensuing description.

I attain these objects by the device illustrated, for example, in the accompanying drawing, in which—

Figure 1 is a perspective view of part of a motor vehicle, including one of the running boards thereof, with my invention mounted thereon;

Fig. 2 is a partial inside elevation of the device, enlarged, part of the vehicle running board being shown in longitudinal section;

Fig. 3 is a detail perspective view of one of the cleats and the retaining spring mounted thereon;

Fig. 4 is a similar view of one of the spacer-hooks;

Fig. 5 is a similar view of one of the hook-washers;

Fig. 6 is an end view of the device in out-of-use condition, the running board being in cross-section; and Fig. 7 is a vertical cross-section on the plane of the line 7—7 of Fig. 2, showing in dotted lines, below, the out-of-use condition as in Fig. 6, and also showing in dotted lines, above, an intermediate condition of the device when being placed in condition for use.

As I prefer to construct my invention, two mating cleats 1 are bolted to the lower side of the vehicle running board 2 at the opposite ends thereof by means of the bolts 3 that are found in the vehicle original construction for holding the running board 2 to the rear wheel guard 4 and the front wheel guard 5 (Fig. 1.) Each cleat 1 is made of an angle bar, one of the members being cut away at one end and the remaining other member at that end being bent down away from the cut-away member, forming a bearing lug 6 (Fig. 3) with an opening therein; and the cut-away member has the holes for the bolts 3 and lies up against the running board 2 with the front edge of the lug 6 about even with the outer edge of the running board (Figs. 6 and 7.) The bolt 3 at the opposite end, near the inner edge of the running board 2, also holds down on the upper surface of the running board a small hook-washer 7 (Fig. 5) with its hook 8 projecting outward the outer edge of the running board and turned up and then inward over the body of the washer 7.

The grating 9 is made up of the frame formed of an angle bar bent to have the long middle upper part 10 and the upright end parts 11; one member of the angle forming the outside of the frame and the other member being recessed to form miter joints at the corners between the part 10 and parts 11. Near the lower ends of the parts 11 this other member is cut away, and the remaining outer member is bent edgewise so that with the grating 9 up along the outer edge of the running board these bent parts incline downward and inward under the running board, forming bearing lugs 12 for the grating, with openings. The grating is made of such length that these lugs 12 fit snugly between the bearing lugs 6 of the cleats 1 bolted to the running board; and the respective lugs 12 are pivoted to the lugs 6 by bolts 13. A lower rail 14 runs from one part 11 of the frame to the other, just above the lower ends of the cut-away members of these parts; being secured to these members inside the angles forming the parts 11. Upright slats 15 are attached to this lower rail and to the upright member of the top part 10 of the frame, inside the angle thereof, at suitable intervals therealong. It will be understood that these may be of any desired number or spacing; or other structure may occupy this part of the grating to serve as adequate retaining means for luggage stored on the running board 2.

The upright end parts 11 of the grating frame have openings 16 near their upper ends, in their inner members; and helical tension springs 17 have upper hooks engaging in these openings 16. At their opposite ends these springs 17 have lower hooks 18 to engage with the hooks 8 of the respective hook-washers 7 for holding the grating 9 in upright luggage-retaining position. Down near the lower ends of these upright parts 11, spacer hooks 19 are pivoted to the respective parts. Each spacer-hook 19 has a transverse pivot opening near one end (Fig. 4) and has that end rounded concentric with the opening; and the other end of the piece has a crotch 20 formed in it, while at one side of this crotch 20 a hook 21 projects. On the opposite edge is a finger-engaging lug 22. The spacer-hook 19 lies inside the outer member of the angular frame part 11, and a rivet passes through that member and through the opening in the spacer hook at such a point that this spacer-hook may drop down, when the grating is upright for use, with the crotch 20 engaging over the outer edge of the running board 2. In this position, the spacer-hooks 19 act as spacers or braces, supporting the grating against the inward pull of the springs 17; so that the grating 9 is firmly held and will not rattle when the vehicle is running. When the spacer-hook 19 is swung up along the frame part 11, its hook 21 can receive and hold the lower hook 18 of the respective spring 17, contracted when released from the washer-hook 8 for placing the grating out of its operating position.

The grating 9 swings down on its pivot bolts 13, out from the running board 2 and then upward and inward thereunder, when not to be used. To catch and hold the grating 9 in this position under the running board 2, flat retaining springs 23 are mounted on the upright members of the cleats 1 near their inner ends. Each spring 23 comprises an upper shoulder 24, facing downwardly, a lower shoulder 25, facing upwardly, and a lower part or tongue 26 extending down from the lower shoulder and curving out thereunder. These springs 23 are fixed to the inner sides of the upright cleat members with their shoulders 24 and 25 facing in toward each other across the length of the device; and when the grating 9 swings up toward the lower side of the running board 2 its end parts 11 engage the respective spring tongues 26, wedging the springs 23 apart, to spring toward each other and engage their shoulders 25 under the edges of these grating parts 11 as the grating continues swinging upward and is stopped by the upper shoulders 24 of the springs. Thereupon the grating 9 is firmly held between the shoulders 24 and 25 up under the running board 2, without rattling under the vibration of the vehicle.

To make the carrier ready for use, the springs 23 are pressed out, releasing the grating 9, which then swings down and is swung out and then up alongside the running board 2. If the operator cannot reach both springs 23 at the same time, they can be released successively; the adjacent part of the grating 9 sagging enough when released to hold the first released spring 23 out of engagement while the other one is released.

When the grating is swung up, the springs 17 are hooked to the spacer-hooks 19, holding the latter up out of position to engage the running board edge. This allows the grating 9 to be swung in over the running board, permitting the user to connect the springs 17 to the washer hooks 8, as indicated by the dotted lines in the upper part of Fig. 7, without having to stretch the springs so much as to make this operation difficult. These springs 17 thus are connected to the washer hooks 8, one at a time, after unhooking them from the spacer-hooks 19. This permits these spacer-hooks 19 to drop down as shown at A in dotted lines in Fig. 7, against the top of the running board 2 near its outer edge. Then the operator grasps the grating 9 and swings it outward slightly past its operative position, which permits the spacer-hooks 19 to drop down and engage their crotches 20 over the running board edge as before mentioned, and as seen by the full lines in Fig. 7. As the operator ceases pulling outward on the grating, against the tension of the springs 17, these springs pull the grating back until it is tightly braced by the spacer-hooks 19 against the spring tension, in upright position for use, as shown by the full lines in Fig. 7.

For putting the grating away, it is first pulled slightly outward, against the tension of the springs 17, until both of the spacer-hooks 19 are swung up above and onto the top of the running board 2. Then upon release of the grating, the springs 17 pull it inward to the dotted-line position of Fig. 7, whereupon the tension of the springs 17 is so reduced that they can be unhooked from the washer hooks 8 with very little exertion. The spacer-hooks 19 can be swung upward onto the running board one at a time, as the grating 9 will deflect, from end to end, under the spring tension, enough to permit this engagement of the released spacer-hook with the top of the running board while the other spacer-hook is so operated. As the springs 17 are unhooked from the washer hooks 8, they are hooked onto the hooks 21 of the respective spacer-hooks, which are swung up to meet the springs. Then all that is necessary is to allow the grating 9 to fall freely, and it will swing up under the running board 2 and enter between the retaining springs 23 as before described; thus latching out of the way automatically, as seen in Fig. 6.

The springs 17, holding the grating 9 up in luggage-retaining position, act as retaining means at the ends of the carrier, to prevent the luggage sliding too far forward or backward along the running board 2. The carrier thus is very effective in use; and when not in use is entirely out of the way, and needs not to be detached bodily and stored elsewhere in the vehicle. The entire device is attached with only four bolts, which are found on the vehicle, without making any openings in or otherwise changing the vehicle construction. This, of course, involves making the carrier of the right proportions to fit a vehicle of a given make; different kinds being required for vehicles of different proportions. Also, of course, the carriers may be made specially for special vehicles; or for installing elsewhere than on the running board. Other modifications may occur, and while certain details are deemed preferable in connection with my invention, and I have shown and described these rather specifically in elucidating the construction and use of my invention, as is required, I do not wish to be understood as being limited to such precise showing and description, but having thus fully described my invention,

What I claim as new and desire to secure by Letters Patent is:

1. In a luggage carrier, a luggage-retaining element mounted to swing upright along the edge of a vehicle luggage-receiving part, or to swing down and then up under said vehicle part, a spring element to hold said luggage-retaining element in said upright position, and means to engage said vehicle part, resisting the pressure of said spring, and movable out of engaging position to permit connection of said spring with reduced effort.

2. In a luggage-carrier, a luggage-retaining element having a pivot at its lower edge on which it is mounted to swing upright along the edge of a vehicle luggage-receiving part, engaging means over near the opposite edge of said vehicle part, and a tension spring connected to an upper part of said luggage-retaining element near one end thereof, to be connected with said engaging means across said vehicle part, for holding said element upright with a part near said pivot engaged tightly against the vehicle part, to prevent rattling of the parts, and forming luggage-retaining means at said end of said element.

3. In a luggage-carrier, a luggage-retaining element having a pivot at its lower edge on which it is mounted to swing upright along the edge of a vehicle luggage-receiving part, engaging means over near the opposite edge of said vehicle part, a tension spring connected to an upper part of said luggage-retaining element near one end thereof, to be connected with said engaging means across said vehicle part, for holding said element upright, with a part near said pivot engaged tightly against the vehicle part, to prevent rattling of the parts, and engaging means on said element, to which said spring is connected when said carrier is out of use.

4. In a luggage-carrier, a luggage-retaining element mounted to swing upright along the edge of a vehicle luggage-receiving part, engaging means on said vehicle part, a tension spring connected to an upper part of said luggage-retaining element near one end thereof, to be connected with said engaging means across said vehicle part, for holding said element upright, and engaging means on said element, to which said spring is connected when said carrier is out of use, movable to engage the edge of the vehicle part and resist the tension of said spring after said spring is connected with said engaging means on said vehicle part with reduced effort.

5. In a luggage-carrier, a spacer-hook having a pivot opening near one end and having a crotch in its opposite end and a hook lug at one side of said crotch.

6. In a luggage-carrier, a spacer-hook having a pivot opening near one end and having a crotch in its opposite end and a hook lug at one side of said crotch, said one end being rounded substantially concentric with said pivot opening.

7. In a luggage carrier, a swinging luggage-retaining element, and a yielding sustaining means to which said element is adapted to be connected, and a brace to resist said sustaining means, brought into bracing position after said sustaining element has been connected to said sustaining means in sustaining position.

RICHARD C. STEWART.